(12) United States Patent
Feichtinger et al.

(10) Patent No.: US 9,216,522 B2
(45) Date of Patent: Dec. 22, 2015

(54) APPARATUS FOR THE PRETREATMENT AND SUBSEQUENT PLASTIFICATION OF PLASTIC MATERIAL WITH MELT FILTER

(71) Applicant: Erema Engineering Recycling Maschinen und Anlagen Gesellschaft M.B.H., Ansfelden (AT)

(72) Inventors: Klaus Feichtinger, Linz (AT); Manfred Hackl, Linz-Urfahr (AT)

(73) Assignee: EREMA ENGINEERING RECYCLING MASCHINEN UND ANLAGEN GESELLSCHAFT M.B.H., Ansfelden (AT)

( * ) Notice: Subject to any disclaimer, the term of this patent is extended or adjusted under 35 U.S.C. 154(b) by 0 days.

(21) Appl. No.: 14/351,710

(22) PCT Filed: Oct. 12, 2012

(86) PCT No.: PCT/AT2012/050157
§ 371 (c)(1),
(2) Date: Apr. 14, 2014

(87) PCT Pub. No.: WO2013/052985
PCT Pub. Date: Apr. 18, 2013

(65) Prior Publication Data
US 2014/0248388 A1    Sep. 4, 2014

(30) Foreign Application Priority Data

Oct. 14, 2011    (AT) ................................. A 1505/2011

(51) Int. Cl.
*B29C 47/10*    (2006.01)
*B29B 13/10*    (2006.01)
(Continued)

(52) U.S. Cl.
CPC ............. *B29B 13/10* (2013.01); *B01F 15/0289* (2013.01); *B02C 18/086* (2013.01);
(Continued)

(58) Field of Classification Search
CPC .. B01F 7/162; B01F 15/0288; B01F 15/0289; B29B 2017/048; B29B 17/0412; B02C 18/086; B29C 47/1027

USPC ........ 366/76.2, 76.3, 76.4, 76.6, 76.9, 76.91, 366/76.92, 76.93, 154.1, 155.1, 156.1, 366/158.4, 91, 147, 149, 168.1, 172.1, 366/172.2, 200, 314; 425/586–587
See application file for complete search history.

(56) References Cited

U.S. PATENT DOCUMENTS

| 2,927,007 A | 3/1960 | Kaether |
| 3,867,194 A | 2/1975 | Straube |

(Continued)

FOREIGN PATENT DOCUMENTS

| AT | 400315 B | 12/1995 |
| CN | 101186103 A | 5/2008 |

(Continued)

OTHER PUBLICATIONS

International Preliminary Report on Patentability mailed Jan. 28, 2014, from PCT Application No. PCT/AT2012/050157 (13 pages).

(Continued)

*Primary Examiner* — Charles Cooley
(74) *Attorney, Agent, or Firm* — Kilpatrick Townsend & Stockton LLP (57) ABSTRACT

Disclosed is an apparatus for processing of plastics, with a container with a mixing implement, and a conveyor provided with a screw rotating in a housing, the housing being divided into two chambers, the frontal chamber having an intake aperture, and the rearward chamber having at least one degassing aperture, the two chambers being connected to one another through a channel having a melt filter, wherein the imaginary continuation of the longitudinal axis of the conveyor in a direction opposite to the direction of conveying passes the axis of rotation, wherein the distance from the opening of the channel into the rearward chamber to the degassing aperture is in a range from 1.5 to 15 times the nominal diameter (d) of the screw.

24 Claims, 4 Drawing Sheets

(51) Int. Cl.
| | | |
|---|---|---|
| B01F 15/02 | (2006.01) | |
| B29B 17/00 | (2006.01) | |
| B29B 17/04 | (2006.01) | |
| B29B 7/66 | (2006.01) | |
| B29C 47/00 | (2006.01) | |
| B02C 18/08 | (2006.01) | |
| B02C 18/12 | (2006.01) | |
| B29C 47/38 | (2006.01) | |
| B29C 47/60 | (2006.01) | |
| B29C 47/64 | (2006.01) | |
| B29C 47/58 | (2006.01) | |
| B29C 47/68 | (2006.01) | |
| B29C 47/76 | (2006.01) | |
| B29C 47/40 | (2006.01) | |
| B29K 105/26 | (2006.01) | |

(52) U.S. Cl.
CPC .......... B02C 18/12 (2013.01); B29B 7/66 (2013.01); B29B 17/0026 (2013.01); B29B 17/0412 (2013.01); B29C 47/0011 (2013.01); B29C 47/385 (2013.01); B29C 47/6018 (2013.01); B29C 47/64 (2013.01); B29B 2017/048 (2013.01); B29C 47/1018 (2013.01); B29C 47/1027 (2013.01); B29C 47/40 (2013.01); B29C 47/585 (2013.01); B29C 47/68 (2013.01); B29C 47/76 (2013.01); B29K 2105/26 (2013.01); Y02W 30/62 (2015.05); Y02W 30/625 (2015.05)

(56) References Cited

U.S. PATENT DOCUMENTS

| | | | | |
|---|---|---|---|---|
| 4,579,288 | A | | 4/1986 | McDermid et al. |
| 5,102,326 | A | * | 4/1992 | Bacher et al. ............... 425/202 |
| 5,282,548 | A | * | 2/1994 | Ishihara ........................ 222/55 |
| 5,651,944 | A | * | 7/1997 | Schulz et al. ............... 422/137 |
| 5,783,225 | A | * | 7/1998 | Bacher et al. ............... 425/202 |
| 5,882,558 | A | * | 3/1999 | Bacher et al. ............... 264/40.4 |
| 5,988,865 | A | * | 11/1999 | Bacher et al. ............. 366/76.93 |
| 6,619,575 | B1 | * | 9/2003 | Bacher et al. ............. 241/46.11 |
| 6,719,454 | B1 | * | 4/2004 | Bacher et al. ............... 366/314 |
| 6,784,214 | B1 | * | 8/2004 | Bacher et al. ............... 521/48 |
| 6,883,953 | B1 | * | 4/2005 | Bacher et al. ............. 366/76.1 |
| 7,275,703 | B2 | * | 10/2007 | Bacher et al. ............. 241/152.2 |
| 7,275,857 | B2 | * | 10/2007 | Bacher et al. ............... 366/314 |
| 7,291,001 | B2 | * | 11/2007 | Bacher et al. ............... 425/202 |
| 7,309,224 | B2 | * | 12/2007 | Bacher et al. ............... 425/202 |
| 7,842,221 | B2 | * | 11/2010 | Magni et al. ................ 264/322 |
| 8,399,599 | B2 | * | 3/2013 | Hackl et al. ............... 528/308.3 |
| 8,419,997 | B2 | * | 4/2013 | Hackl et al. ............... 264/328.17 |
| 8,616,478 | B2 | * | 12/2013 | Weigerstorfer et al. ........ 241/57 |
| 8,835,594 | B2 | | 9/2014 | Hackl et al. |
| 8,992,067 | B2 | | 3/2015 | Bacher et al. |
| 2004/0202744 | A1 | | 10/2004 | Bacher et al. |
| 2004/0232578 | A1 | | 11/2004 | Magni et al. |
| 2006/0093696 | A1 | * | 5/2006 | Bacher et al. ............... 425/200 |
| 2006/0292259 | A1 | * | 12/2006 | Bacher et al. ............... 425/217 |
| 2007/0007375 | A1 | * | 1/2007 | Bacher et al. ............. 241/199.12 |
| 2007/0102550 | A1 | * | 5/2007 | Lin ............................. 241/277 |
| 2010/0101454 | A1 | * | 4/2010 | Wendelin et al. ............ 106/243 |
| 2010/0140381 | A1 | * | 6/2010 | Weigerstorfer et al. ........ 241/17 |
| 2011/0049763 | A1 | * | 3/2011 | Hackl et al. ............... 264/328.17 |
| 2011/0251368 | A1 | * | 10/2011 | Hackl et al. ................ 526/352 |
| 2012/0091609 | A1 | * | 4/2012 | Feichtinger et al. ........ 264/37.31 |
| 2012/0200000 | A1 | | 8/2012 | Klein et al. |
| 2013/0092768 | A1 | * | 4/2013 | Feichtinger et al. ............. 241/20 |
| 2013/0113139 | A1 | * | 5/2013 | Weigerstorfer et al. ...... 264/340 |
| 2013/0168201 | A1 | * | 7/2013 | Hackl et al. .................. 193/2 R |
| 2014/0234461 | A1 | * | 8/2014 | Feichtinger et al. .......... 425/202 |
| 2014/0234462 | A1 | * | 8/2014 | Feichtinger et al. .......... 425/202 |
| 2014/0239104 | A1 | * | 8/2014 | Feichtinger et al. ....... 241/188.1 |
| 2014/0248388 | A1 | * | 9/2014 | Feichtinger et al. .......... 425/203 |
| 2014/0252147 | A1 | | 9/2014 | Feichtinger et al. |
| 2014/0252148 | A1 | | 9/2014 | Feichtinger et al. |
| 2014/0271968 | A1 | | 9/2014 | Feichtinger et al. |
| 2014/0287081 | A1 | | 9/2014 | Feichtinger et al. |
| 2014/0291427 | A1 | | 10/2014 | Feichtinger et al. |
| 2014/0295016 | A1 | | 10/2014 | Feichtinger et al. |
| 2014/0299700 | A1 | | 10/2014 | Feichtinger et al. |
| 2014/0312151 | A1 | | 10/2014 | Feichtinger et al. |

FOREIGN PATENT DOCUMENTS

| | | | |
|---|---|---|---|
| DE | 2839446 B1 | 1/1980 | |
| DE | 3525554 A1 | 2/1986 | |
| DE | 10140215 A1 | 2/2003 | |
| DE | 202009015256 U1 | 4/2010 | |
| EP | 0045734 A1 | 2/1982 | |
| EP | 0103754 A1 | 3/1984 | |
| EP | 0123771 A1 | 11/1984 | |
| EP | 0321742 A1 | 6/1989 | |
| EP | A-7-148736 | 6/1995 | |
| EP | 0701505 A1 | 3/1996 | |
| EP | 0735945 A1 | 10/1996 | |
| EP | 0911131 A1 | 4/1999 | |
| EP | 1181141 A1 | 2/2002 | |
| EP | 1233855 A1 | 8/2002 | |
| EP | 0820375 A1 | 1/2003 | |
| EP | 1273412 A1 | 1/2003 | |
| EP | 1401623 A1 | 3/2004 | |
| EP | 1628812 A1 | 3/2006 | |
| EP | 1628813 A1 | 3/2006 | |
| EP | 2012997 A1 | 1/2009 | |
| EP | 2196255 A1 | 6/2010 | |
| ES | 2214171 T1 | 9/2004 | |
| GB | 2030472 A | 4/1980 | |
| JP | 2001-26019 A | 1/2001 | |
| JP | 2001-30244 A | 2/2001 | |
| SU | 536062 A1 | 11/1976 | |
| WO | WO 97/18071 A1 | 5/1997 | |
| WO | WO 01/81058 A1 | 11/2001 | |
| WO | WO 0181058 A1 * | 11/2001 | |
| WO | WO 02/36318 A1 | 5/2002 | |
| WO | WO 03/004236 A1 | 1/2003 | |
| WO | WO 03/103915 A1 | 12/2003 | |
| WO | WO 2004/087391 A1 | 10/2004 | |
| WO | WO 2004087391 A1 * | 10/2004 | .............. B29B 17/00 |
| WO | WO 2004/108379 A1 | 12/2004 | |
| WO | 2010/118447 A1 | 10/2010 | |
| WO | WO 2011/051154 A1 | 5/2011 | |

OTHER PUBLICATIONS

International Search Report mailed Feb. 6, 2013, from PCT Application No. PCT/AT2012/050157 (9 pages).
Bacher H., "Recycling Von Thermoplastischen Primaerabfaellen: Recycling Primary Thermoplastic Waste," Plastverarbeiter, Huethig GmbH, Heidelberg, DE, vol. 46, No. 2, Feb. 1, 1995, pp. 94, 97, & 98, XP000494391, ISSN: 0032-1338.
"Recyclinganlage Mit Grosser Flexibilitaet Und Verbesserter Effizienz: High-Flexibility Recycling System with Improved Efficiency," Plastverarbeiter, Huethig GmbH, Heidelberg, DE, vol. 43, No. 10, Oct. 1, 1992, pp. 36-38, XP000310013, ISSN: 0032-1338.
Kowalska B., "Genutete Einzugszonen Konstruktionsvarianten Fuer Einschneckenextruder: Grooved Feed Zones Design Variations for Single-Screw Extruders," Kunstoffe International, Carl Hanser Verlag, Munchen, DE, vol. 90, No. 2, Feb. 1, 2000, pp. 34-36, 38, XP000936826, ISSN: 0023-5563.
U.S. Appl. No. 14/351,677. Claims filed Mar. 24, 2015.
U.S. Appl. No. 14/351,869. Claims filed Mar. 11, 2015.

* cited by examiner

APPARATUS FOR THE PRETREATMENT AND SUBSEQUENT PLASTIFICATION OF PLASTIC MATERIAL WITH MELT FILTER

FIELD OF THE INVENTION

The invention relates to an apparatus for the pretreatment and subsequent plastification of plastics, in particular of thermoplastics waste for recycling purposes.

BACKGROUND

Methods of this kind and apparatuses in similar form have already long been known from the prior art. For instance, it is known to treat plastics material that is to be recycled first at elevated temperature in a cutter compactor and, optionally with exposure to reduced pressure, then to melt it in an extruder and to filter the melt, which is subsequently degassed and, lastly, subjected to pelletizing, for example. Apparatuses for implementing such methods are known for example from EP 123 771 B, EP 390 873 B or AT 396 900 B.

There are also numerous methods and apparatuses in existence for optimizing individual steps, as for example the degassing of the melt. Thus, for example, an unpressurized zone may be provided ahead of the degassing apertures, in order to ensure reliable degassing of the plastics material. There are also numerous embodiments of various melt filters in existence, for the removal of solid extraneous substances and/or unmelted residual polymer.

All of this serves primarily to increase the quality of the end product.

A feature shared by the known cutter compactors and containers mentioned in the introduction is that the direction of conveying or of rotation of the mixing and comminution implements, and therefore the direction in which the particles of material circulate in the receiver (receiving container), and the direction of conveying of the extruder, are in essence identical or have the same sense. This arrangement, selected intentionally, was the result of the desire to maximize stuffing of the material into the screw, or to force-feed the screw. This concept of stuffing the particles into the conveying screw or extruder screw in the direction of conveying of the screw was also very obvious and was in line with the familiar thinking of the person skilled in the art, since it means that the particles do not have to reverse their direction of movement and there is therefore no need to exert any additional force for the change of direction. An objective here, and in further derivative developments, was always to maximize screw fill and to amplify this stuffing effect. By way of example, attempts have also been made to extend the intake region of the extruder in the manner of a cone or to curve the comminution implements in the shape of a sickle, so that these can act like a trowel in feeding the softened material into the screw. Displacement of the extruder, on the inflow side, from a radial position to a tangential position in relation to the container further amplified the stuffing effect, and increased the force with which the plastics material from the circulating implement was conveyed or forced into the extruder.

Apparatuses of this type are in principle capable of functioning, and they operate satisfactorily, although with recurring problems:

By way of example, an effect repeatedly observed with materials with low energy content, e.g. PET fibres or PET foils, or with materials which at a low temperature become sticky or soft, e.g. polylactic acid (PLA) is that when, intentionally, stuffing of the plastics material into the intake region of the extruder, under pressure, is achieved by components moving in the same sense, this leads to premature melting of the material immediately after, or else in, the intake region of the extruder. This firstly reduces the conveying effect of the extruder, and secondly there can also be some reverse flow of this melt into the region of the cutter compactor or receiver, with the result that flakes that have not yet melted adhere to the melt, and in turn the melt thus cools and to some extent solidifies, with resultant formation of a clump or conglomerate made of to some extent solidified melt and of solid plastics particles. This causes blockage on the intake of the extruder and caking of the mixing and comminution implements. A further consequence is reduction of the throughput of the extruder, since adequate filling of the screw is no longer achieved. Another possibility here is that movement of the mixing and comminution implements is prevented. In such cases, the system normally has to be shut down and thoroughly cleaned.

Problems also occur with polymer materials which have already been heated in the cutter compactor up to the vicinity of their melting range. If overfilling of the intake region occurs here, the material melts and intake is impaired.

Problems are also encountered with fibrous materials that are mostly orientated and linear, with a certain amount of longitudinal elongation and low thickness or stiffness, for example plastics foils cut into strips. A main reason for this is that the elongate material is retained at the outflow end of the intake aperture of the screw, where one end of the strip protrudes into the receiver and the other end protrudes into the intake region. Since the mixing implements and the screw are moving in the same sense or exert the same conveying-direction component and pressure component on the material, both ends of the strip are subjected to tension and pressure in the same direction, and release of the strip becomes impossible. This in turn leads to accumulation of the material in the said region, to a narrowing of the cross section of the intake aperture, and to poorer intake performance and, as a further consequence, to reduced throughput. The increased feed pressure in this region can moreover cause melting, and this in turn causes the problems mentioned in the introduction.

SUMMARY

It is an object of the present invention to provide an improved apparatus for the recycling of plastics that yields an end product of high quality, the apparatus being operable with high productivity and high throughput.

The characterizing features described and illustrated herein achieve this object in an apparatus of the type mentioned in the introduction.

A first provision here is that the imaginary continuation of the central longitudinal axis of the extruder, if this has only a single screw, or the longitudinal axis of the screw closest to the intake aperture, if the extruder has more than one screw, in the direction opposite to the direction of conveying of the extruder, passes, and does not intersect, the axis of rotation, where, on the outflow side, there is an offset distance between the longitudinal axis of the extruder, if this has a single screw, or the longitudinal axis of the screw closest to the intake aperture, and the radial that is associated with the container and that is parallel to the longitudinal axis and that proceeds outwards from the axis of rotation of the mixing and/or comminution implement in the direction of conveying of the extruder.

The direction of conveying of the mixing implements and the direction of conveying of the extruder are therefore no longer in the same sense, as is known from the prior art, but instead are at least to a small extent in the opposite sense, and the stuffing effect mentioned in the introduction is thus reduced. The intentional reversal of the direction of rotation of the mixing and comminution implements in comparison with apparatuses known hitherto reduces the feed pressure on the intake region, and the risk of overfilling decreases. In this way, excess material is not stuffed or trowelled with excess pressure into the intake region of the extruder, but instead, in contrast, there is in fact in turn a tendency to remove excess material from that region, in such a way that although there is always sufficient material present in the intake region, the additional pressure exerted is small or almost zero. This method can provide adequate filling of the extruder screw and constant intake of sufficient material by the screw, without any overfilling of the screw with, as a further consequence, local pressure peaks where the material could melt.

Melting of the material in the region of the extruder intake is thus prevented, and operating efficiency is therefore increased, maintenance intervals are therefore lengthened, and downtime due to possible repairs and cleaning measures is reduced.

By virtue of the reduced feed pressure, displaceable elements which can be used in a known manner to regulate the degree of filling of the screw react markedly more sensitively, and the degree of filling of the screw can be adjusted with even greater precision. This makes it easier to find the ideal point at which to operate the system, in particular for relatively heavy materials, for example regrind made of high-density polyethylene (HDPE) or PET.

Surprisingly and advantageously it has moreover been found that operation in the opposite sense, according to the invention, improves intake of materials which have already been softened almost to the point of melting. In particular when the material is already in a doughy or softened condition, the screw cuts the material from the doughy ring adjacent to the container wall. In the case of a direction of rotation in the direction of conveying of the extruder screw, this ring would instead be pushed onward, and removal of an outer layer by the screw would not be possible, with resultant impairment of intake. The reversal of the direction of rotation, according to the invention, avoids this.

Furthermore, the retention or accumulation phenomena formed in the case of the treatment of the above-described strip-shaped or fibrous materials can be resolved more easily, or do not occur at all, since, at the aperture edge situated in the direction of rotation of the mixing implements on the outflow side or downstream, the direction vector for the mixing implements and the direction vector for the extruder point in almost opposite directions, or in directions that at least to a small extent have opposite sense, and an elongate strip cannot therefore become curved around, and retained by, the said edge, but instead becomes entrained again by the mixing vortex in the receiver.

The overall effect of the design according to the invention is that intake performance is improved and throughput is markedly increased. The stability and performance of the entire system made of cutter compactor and extruder is thus increased.

Provision is additionally made for the length L of the screw in the frontal chamber, measured from the intake aperture edge situated downstream in the direction of conveying of the screw, to the opening, formed in the housing, of the channel which is situated furthest upstream and which leads to the melt filter, to be in a range from 10 to 40 times the average nominal diameter $d$ of the screw.

Provision is further made for the distance from the opening of the channel into the rearward chamber to the degassing aperture situated furthest upstream to be in a range from 1.5 to 15 times the average nominal diameter of the screw.

It has surprisingly emerged that by providing the cutter compactor, with counter-directional rotation, it is possible to operate at relatively high temperatures and to achieve more effective homogenization of the material. It is therefore possible to shorten the distance to the melt filter, or to arrange the melt filter at an earlier point. Moreover, as a result of the increased temperature, degassing is improved and it is also possible to shorten the section up to the first degassing aperture. Processing the material in the cutting compactor at a relatively high temperature allows volatile gases to leave the material in this early area. This is particularly efficient insofar as the surface area of the particles, usually in the form of film-like material or grindstock-like material, is large, and hence moisture or volatile substances are more easily able to escape from or out of the material, and, as a result of the intensive mixing, the particles arrive at the surface again and again or are exchanged again and again, and the gases are therefore easily able to leave the container. For this reason, fewer volatile substances remain in the material which is to be melted, and consequently the melt can be more effectively degassed.

Accordingly, with a higher quality of the melt and hence of the end product, the construction of the apparatus is simplified and made shorter.

Further advantageous embodiments of the invention are described via the following features:

According to one advantageous embodiment of the invention, a homogenizing unit for homogenizing the filtered melt is connected downstream, after the opening of the channel into the rearward chamber, and ahead of the degassing aperture situated the furthest upstream. Here, the melt is subjected to an intense shearing stress and stretching stress, and is highly accelerated. Alternatively, in this region, the screw has a flight geometry that brings about homogenization of the melt.

It is advantageous if the step of homogenizing takes place not until after filtration, but before the degassing of the melt, since in this way the homogenization is not adversely affected by any coarse impurities or solid extraneous substances, or unmelted clusters of plastic, and at the same time the subsequent degassing operation can be accomplished effectively and efficiently, with the possibility for almost complete removal of the gas bubbles from the melt. In this way it is possible to achieve an end material of high quality that can be used for various subsequent operations.

In this connection it is advantageous if the homogenizing unit, more particularly the screw, has a section which is preferably situated upstream and with which the melt is sheared, and has a further section, preferably situated downstream thereof, with which the melt is mixed.

The operation of homogenizing is a relatively complex one. It is advantageous here if the material is subjected not only to shearing but also to subsequent mixing, with a simultaneous increase in the temperature of the melt and also a simultaneous mixing of the sheared parts with the less-sheared parts. In this way it is possible to achieve a uniform melt with finely divided and very small contaminants, which can be subsequently subjected to optimum and effective degassing.

According to a further advantageous process regime, provision is made for the temperature of the material or melt during or at least at the end of homogenizing and before the beginning of degassing, to be at least as high as, preferably higher than, the temperatures in all other treatment steps.

A structurally advantageous plant is one wherein the container, the extruder, the chambers, the melt filter or filters, the homogenizing unit and the degassing aperture or apertures are disposed axially in series or lie on a common longitudinal axis or lie around a common longitudinal axis. By this means the overall apparatus becomes very narrow and space-saving.

One effective means of separating the chambers from one another is for the two chambers to be separated by a back-conveying thread which is provided on the periphery of the screw.

In this connection it is advantageous if the openings of the channel open out and in, respectively, immediately before and after the back-conveying thread, respectively.

In order to enhance degassing, the screw, between the opening of the channel into the rearward chamber and the degassing aperture that is situated furthest upstream, may be designed with a decompressing action or may have a flight geometry which produces an unpressurized zone extending preferably up to the degassing apertures.

According to one advantageous development of the invention, it is envisaged that the extruder is arranged on the receiver in such a way that the scalar product of the direction vector (direction vector that is associated with the direction of rotation) that is tangential to the circle described by the radially outermost point of the mixing and/or comminution implement or to the plastics material transported past the aperture and that is normal to a radius of the receiver, and that points in the direction of rotation or of movement of the mixing and/or comminution implement and of the direction vector that is associated with the direction of conveying of the extruder at each individual point or in the entire region of the aperture or at each individual point or in the entire region immediately radially in front of the aperture is zero or negative. The region immediately radially in front of the aperture is defined as that region which is in front of the aperture and at which the material is just about to pass through the aperture but has not yet passed the aperture. The advantages mentioned in the introduction are thus achieved, and there is effective avoidance of all types of agglomeration in the region of the intake aperture, brought about by stuffing effects. In particular here, there is also no dependency on the spatial arrangement of the mixing implements and of the screw in relation to one another, and by way of example the orientation of the axis of rotation does not have to be normal to the basal surface or to the longitudinal axis of the extruder or of the screw. The direction vector that is associated with the direction of rotation and the direction vector that is associated with the direction of conveying lie within a, preferably horizontal, plane, or in a plane orientated so as to be normal to the axis of rotation.

In another advantageous formation, the angle included between the direction vector that is associated with the direction of rotation of the mixing and/or comminution implement and the direction vector that is associated with the direction of conveying of the extruder is greater than or equal to 90° and smaller than or equal to 180°, where the angle is measured at the point of intersection of the two direction vectors at the edge that is associated with the aperture and that is situated upstream of the direction of rotation or of movement, in particular at the furthest upstream point on the said edge or on the aperture. This therefore describes the range of angles within which the extruder must be arranged on the receiver in order to achieve the advantageous effects. In the entire region of the aperture or at each individual point of the aperture, the forces acting on the material are therefore orientated at least to a small extent in an opposite sense, or in the extreme case the orientation is perpendicular and pressure-neutral. At no point of the aperture is the scalar product of the direction vectors of the mixing implements and of the screw positive, and no excessive stuffing effect occurs even in a subregion of the aperture.

Another advantageous formation of the invention provides that the angle included between the direction vector that is associated with the direction of rotation or of movement and the direction vector that is associated with the direction of conveying is from 170° to 180°, measured at the point of intersection of the two direction vectors in the middle of the aperture. This type of arrangement is relevant by way of example when the extruder is arranged tangentially on the cutter compactor.

In order to ensure that no excessive stuffing effect occurs, the distance or offset between the longitudinal axis and the radius can advantageously be greater than or equal to half of the internal diameter of the housing of the extruder or of the screw.

It can moreover be advantageous for these purposes to set the distance or offset between the longitudinal axis and the radius to be greater than or equal to 7%, or still more advantageously greater than or equal to 20%, of the radius of the receiver. In the case of extruders with a prolonged intake region or with grooved bushing or with extended hopper, it can be advantageous for this distance or offset to be greater than or equal to the radius of the receiver. This is particularly true for cases where the extruder is attached tangentially to the receiver or runs tangentially to the cross section of the container.

It is particularly advantageous if the longitudinal axis of the extruder or of the screw or the longitudinal axis of the screw closest to the intake aperture runs tangentially with respect to the inner side of the side wall of the container, or the inner wall of the housing does so, or the enveloping end of the screw does so, it being preferable that there is a drive connected to the end of the screw, and that the screw provides conveying, at its opposite end, to a discharge aperture, in particular an extruder head, arranged at the end of the housing.

In the case of extruders that are radially offset, but not arranged tangentially, it is advantageous to provide that the imaginary continuation of the longitudinal axis of the extruder in a direction opposite to the direction of conveying, at least in sections, passes, in the form of a secant, through the space within the receiver.

It is advantageous to provide that there is immediate and direct connection between the aperture and the intake aperture, without substantial separation or a transfer section, e.g. a conveying screw. This permits effective and non-aggressive transfer of material.

The reversal of the direction of rotation of the mixing and comminution implements circulating in the container can certainly not result from arbitrary action or negligence, and it is not possible—either in the known apparatuses or in the apparatus according to the invention—simply to allow the mixing implements to rotate in the opposite direction, in particular because the arrangement of the mixing and comminution implements is in a certain way asymmetrical or direction-oriented, and their action is therefore only single-sided or unidirectional. If this type of equipment were to be rotated intentionally in the wrong direction, a good mixing vortex would not form, and there would be no adequate comminution or heating of the material. Each cutter compactor therefore has its unalterably prescribed direction of rotation of the mixing and comminution implements.

In this connection, it is particularly advantageous to provide that the manner of formation, set-up, curvature and/or arrangement of the frontal regions or frontal edges that are associated with the mixing and/or comminution implements, act on the plastics material and point in the direction of rotation or of movement, differs when comparison is made with the regions that, in the direction of rotation or of movement, are at the rear or behind.

An advantageous arrangement here provides that, on the mixing and/or comminution implement, implements and/or blades have been arranged which, in the direction of rotation or of movement, have a heating, comminuting and/or cutting effect on the plastics material. The implements and/or blades can either have been fastened directly on the shaft or preferably have been arranged on a rotatable implement carrier or, respectively, a carrier disc arranged in particular parallel to the basal surface, or have been formed therein or moulded onto the same, optionally as a single piece.

In principle, the effects mentioned are relevant not only to greatly compressing melting extruders or agglomerators but also to conveying screws that have less compressing effect. Here again, local overfeed is avoided.

In another particularly advantageous formation, it is provided that the receiver is in essence cylindrical with a level basal surface and with, orientated vertically in relation thereto, a side wall which has the shape of the jacket of a cylinder. In another simple design, the axis of rotation coincides with the central axis of the receiver. In another advantageous formation, the axis of rotation or the central axis of the container have been orientated vertically and/or normally in relation to the basal surface. These particular geometries optimize intake performance, with an apparatus design that provides stability and simple construction.

In this connection it is also advantageous to provide that the mixing and/or comminution implement or, if a plurality of mutually superposed mixing and/or comminution implements have been provided, the lowest mixing and/or comminution implement closest to the base is arranged at a small distance from the basal surface, in particular in the region of the lowest quarter of the height of the receiver, and also that the aperture is similarly arranged. The distance here is defined and measured from the lowest edge of the aperture or of the intake aperture to the container base in the edge region of the container. There is mostly some rounding of the edge at the corner, and the distance is therefore measured from the lowest edge of the aperture along the imaginary continuations of the side wall downwards to the imaginary outward continuation of the container base. Distances with good suitability are from 10 to 400 mm.

It is also advantageous for the processing if the radially outermost edges of the mixing and/or comminution implements almost reach the side wall.

The container does not necessarily have to have a cylindrical shape with circular cross section, even though this shape is advantageous for practical reasons and reasons of manufacturing technology. When container shapes that deviate from the cylindrical shape with circular cross section, examples being containers having the shape of a truncated cone or cylindrical containers which, in plan view, are elliptical or oval, a calculation is required for conversion to a cylindrical container which has circular cross section and the same volume capacity, on the assumption that the height of this imaginary container is the same as its diameter. Container heights here which are substantially higher than the resultant mixing vortex (after taking into account the distance required for safety) are ignored, since this excess container height is not utilized and it therefore has no further effect on the processing of the material.

The expression extruder in the present text means extruders used for complete melting of the material.

All of the examples described in the figure below depict compressing single-screw extruders. However, it is also possible as an alternative to provide twin- or multiscrew extruders, in particular with a plurality of identical screws, which at least have the same diameters d.

BRIEF DESCRIPTION OF THE DRAWINGS

Further features and advantages of the invention are apparent from the description of the inventive examples below of the subject matter of the invention, which are not to be interpreted as restricting, and which the drawings depict diagrammatically and not to scale.

DETAILED DESCRIPTION OF THE PREFERRED EMBODIMENTS

Neither the containers, nor the screws nor the mixing implements are to scale, either themselves or in relation to one another, in the drawings. By way of example, therefore, the containers are in reality mostly larger, or the screws longer, than depicted here.

Figure 1:
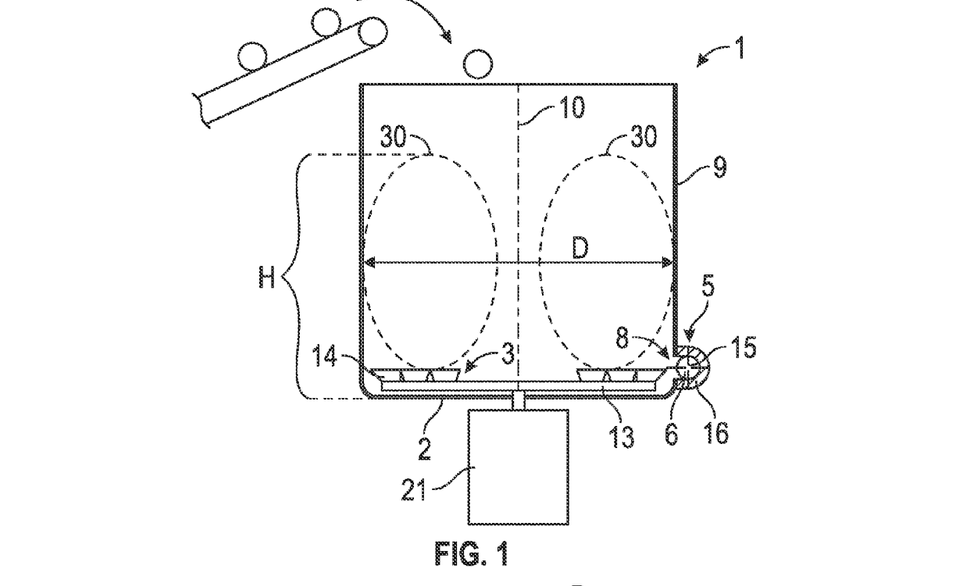
FIG. 1 shows a vertical section through an apparatus according to the invention with extruder attached approximately tangentially.
Figure 2:
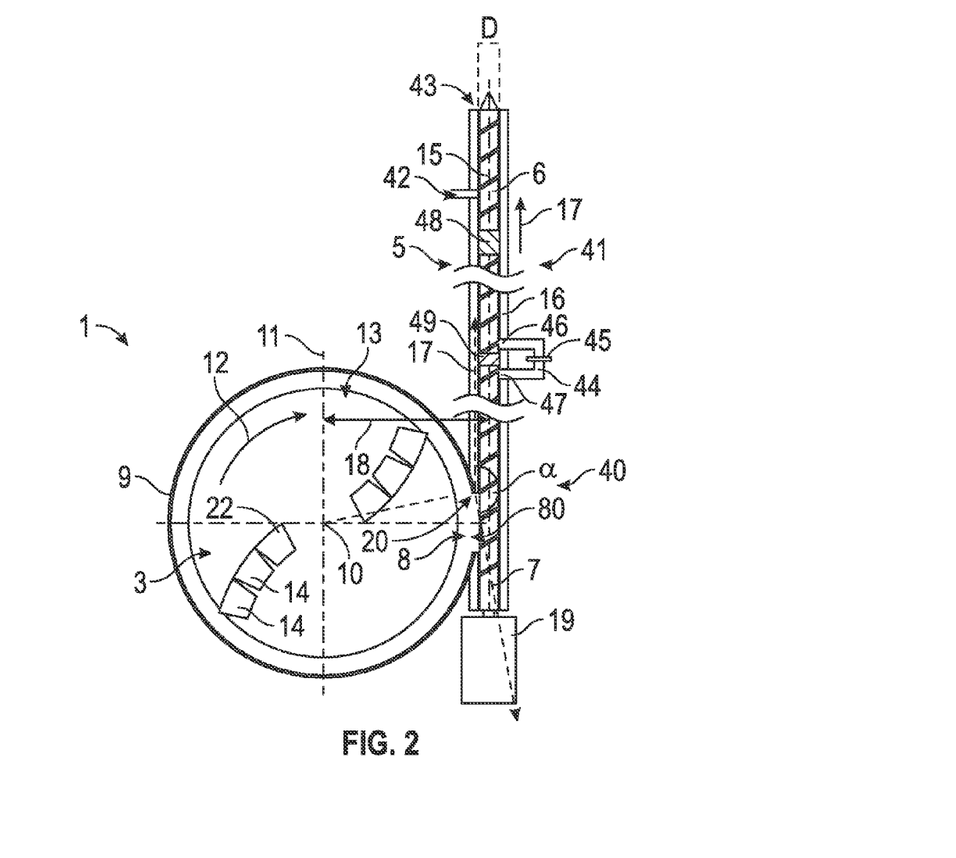
FIG. 2 shows a horizontal section through the embodiment of FIG. 1.

The advantageous cutter compactor-extruder combination depicted in FIG. 1 and FIG. 2 for the treatment or recycling of plastics material has a cylindrical container or cutter compactor or shredder 1 with circular cross section, with a level, horizontal basal surface 2 and with a vertical side wall 9 oriented normally thereto with the shape of a cylinder jacket.

Arranged at a small distance from the basal surface 2, at most at about 10 to 20%, or optionally less, of the height of the side wall 9—measured from the basal surface 2 to the uppermost edge of the side wall 9—is an implement carrier 13 or a level carrier disc orientated parallel to the basal surface 2, which carrier or disc can be rotated, in the direction 12 of rotation or of movement indicated by an arrow 12, around a central axis 10 of rotation, which is simultaneously the central axis of the container 1. A motor 21, located below the container 1, drives the carrier disc 13. On the upper side of the carrier disc 13, blades or implements, e.g. cutter blades, 14 have been arranged, and together with the carrier disc 13 form the mixing and/or comminution implement 3.

As indicated in the diagram, the blades 14 are not arranged symmetrically on the carrier disc 13, but instead have a particular manner of formation, set-up or arrangement on their frontal edges 22 facing in the direction 12 of rotation or of movement, so that they can have a specific mechanical effect on the plastics material. The radially outermost edges of the mixing and comminution implements 3 reach a point which is relatively close to, about 5% of the radius 11 of the container 1 from, the inner surface of the side wall 9.

The container 1 has, near the top, a charging aperture through which the product to be processed, e.g. portions of plastics foils, is charged by way of example by means of a conveying device in the direction of the arrow. The container 1 can, as an alternative, be a closed container and capable of evacuation at least as far as an industrial vacuum, the material being introduced by way of a system of valves. The said product is received by the circulating mixing and/or comminution implements 3 and is raised to form a mixing vortex 30, where the product rises along the vertical side wall 9 and, approximately in the region of the effective container height H, falls back again inward and downward into the region of the centre of the container, under gravity. The effective height H of the container 1 is approximately the same as its internal diameter D. In the container 1, a mixing vortex 30 is thus formed, in which the material is circulated in a vortex both from top to bottom and also in the direction 12 of rotation. By virtue of this particular arrangement of the mixing and comminution elements 3 or the blades 14, this type of apparatus can therefore be operated only with the prescribed direction 12 of rotation or movement, and the direction 12 of rotation cannot be reversed readily or without additional changes.

The circulating mixing and comminution implements 3 comminute and mix the plastics material introduced, and thereby heat and soften it by way of the mechanical frictional energy introduced, but do not melt it. After a certain residence time in the container 1, the homogenized, softened, doughy but not molten material is, as described in detail below, removed from the container 1 through an aperture 8, passed into the intake region of an extruder 5, and received by a screw 6 there and subsequently melted.

At the level of the, in the present case single, comminution and mixing implement 3, the said aperture 8 is formed in the side wall 9 of the container 1, and the pretreated plastics material can be removed from the interior of the container 1 through this aperture. The material is passed to a single-screw extruder 5 arranged tangentially on the container 1, where the housing 16 of the extruder 5 has, situated in its jacket wall, an intake aperture 80 for the material to be received by the screw 6. This type of embodiment has the advantage that the screw 6 can be driven from the lower end in the drawing by a drive, depicted only diagrammatically, in such a way that the upper end of the screw 6 in the drawing can be kept free from the drive. The discharge aperture for the plastified or agglomerated plastics material conveyed by the screw 6 can therefore be arranged at this upper end, e.g. in the form of an extruder head not depicted. The plastics material can therefore be conveyed without deflection by the screw 6 through the discharge aperture; this is not readily possible in the embodiments according to FIGS. 3 and 4.

There is connection for conveying of material or for transfer of material between the intake aperture 80 and the aperture 8, and in the present case this connection to the aperture 8 is direct and immediate and involves no prolonged intervening section and no separation. All that is provided is a very short transfer region.

In the housing 16, there is a screw 6 with compressing effect, mounted rotatably around its longitudinal axis 15. The longitudinal axis 15 of the screw 6 and that of the extruder 5 coincide. The extruder 5 conveys the material in the direction of the arrow 17. The extruder 5 is a conventional extruder known per se in which the softened plastics material is compressed and thus melted, and the melt is then discharged at the opposite end, at the extruder head.

The mixing and/or comminution implements 3 or the blades 14 are at approximately the same level as the central longitudinal axis 15 of the extruder 5. The outermost ends of the blades 14 have adequate separation from the flights of the screw 6.

In the embodiment according to FIGS. 1 and 2, the extruder 5 is, as mentioned, attached tangentially to the container 1, or runs tangentially in relation to its cross section. In the drawing, the imaginary continuation of the central longitudinal axis 15 of the extruder 5 or of the screw 6 in a direction opposite to the direction 17 of conveying of the extruder 5 towards the rear passes the axis 10 of rotation and does not intersect the same. On the outflow side, there is an offset distance 18 between the longitudinal axis 15 of the extruder 5 or of the screw 6 and the radius 11 of the container 1 that is parallel to the longitudinal axis 15 and that proceeds outwards from the axis 10 of rotation of the mixing and/or comminution implement 3 in the conveying direction 17 of the conveyor 5. In the present case, the imaginary continuation of the longitudinal axis 15 of the extruder 5 towards the rear does not pass through the space within the container 1, but instead passes it at a short distance.

The distance 18 is somewhat greater than the radius of the container 1. There is therefore a slight outward offset of the extruder 5, or the intake region is somewhat deeper.

The expressions "opposite", "counter-" and "in an opposite sense" here mean any orientation of the vectors with respect to one another which is not acute-angled, as explained in detail below.

In other words, the scalar product of a direction vector 19 which is associated with the direction 12 of rotation and the orientation of which is tangential to the circle described by the outermost point of the mixing and/or comminution implement 3 or tangential to the plastics material passing the aperture 8, and which points in the direction 12 of rotation or movement of the mixing and/or comminution implements 3, and of a direction vector 17 which is associated with the direction of conveying of the extruder 5 and which proceeds in the direction of conveying parallel to the central longitudinal axis 15 is everywhere zero or negative, at each individual point of the aperture 8 or in the region radially immediately in front of the aperture 8, and is nowhere positive.

In the case of the intake aperture in FIGS. 1 and 2, the scalar product of the direction vector 19 for the direction 12 of rotation and of the direction vector 17 for the direction of conveying is negative at every point of the aperture 8.

The angle α between the direction vector 17 for the direction of conveying and the direction vector for the direction 19 of rotation, measured at the point 20 that is associated with the aperture 8 and situated furthest upstream of the direction 12 of rotation, or at the edge associated with the aperture 8 and situated furthest upstream, is approximately maximally about 170°.

As one continues to proceed downwards along the aperture 8 in FIG. 2, i.e. in the direction 12 of rotation, the oblique angle between the two direction vectors continues to increase. In the centre of the aperture 8, the angle between the direction vectors is about 180° and the scalar product is maximally negative, and further downwards from there the angle indeed becomes >180° and the scalar product in turn decreases, but still remains negative. However, these angles are no longer termed angles α, since they are not measured at point 20.

An angle β, not included in the drawing in FIG. 2, measured in the centre of the aperture 8, between the direction vector for the direction 19 of rotation and the direction vector for the direction 17 of conveying is about 178° to 180°.

The apparatus according to FIG. 2 represents the first limiting case or extreme value. This type of arrangement can provide a very non-aggressive stuffing effect or a particularly advantageous feed, and this type of apparatus is particularly advantageous for sensitive materials which are treated in the vicinity of the melting range, or for product in the form of long strips.

The section in which the melting of the material takes place is shown particularly clearly in FIG. 2. A similar apparatus, in a sectional side view, is also shown in FIG. 5c.

Figure 5A:
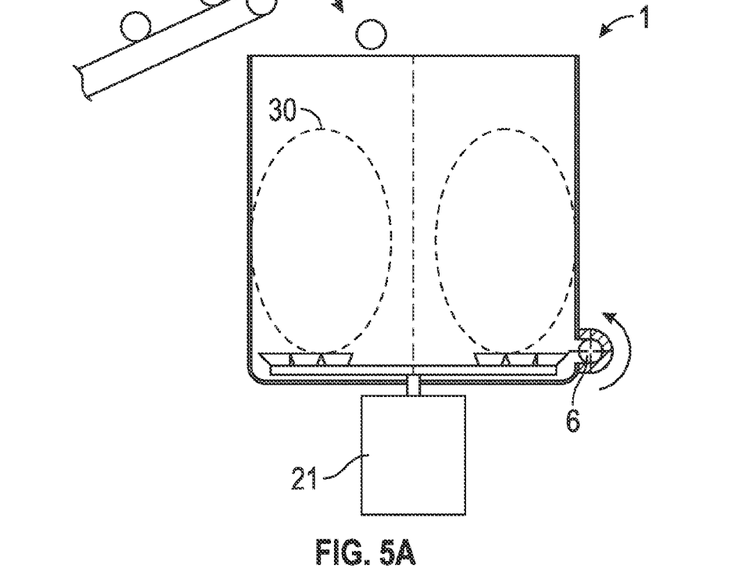
FIGS. 5*a*, *b* and *c* show an alternative embodiment of the apparatus from different perspectives.
Figure 5B:
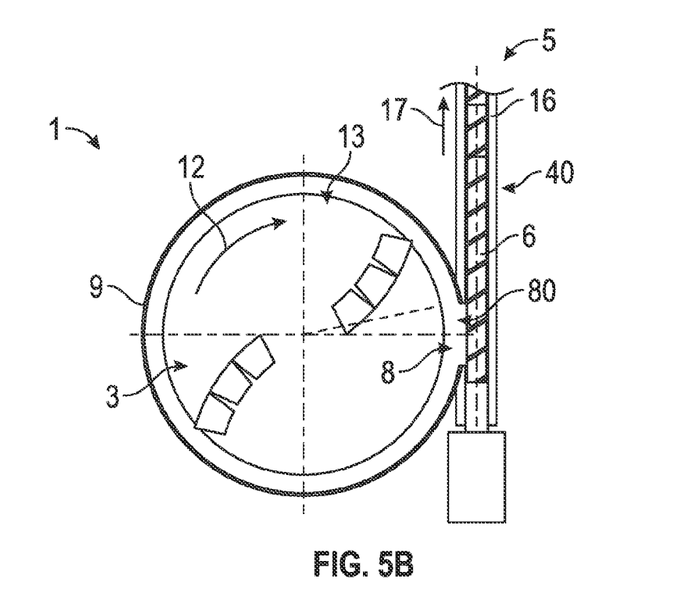
Figure 5C:
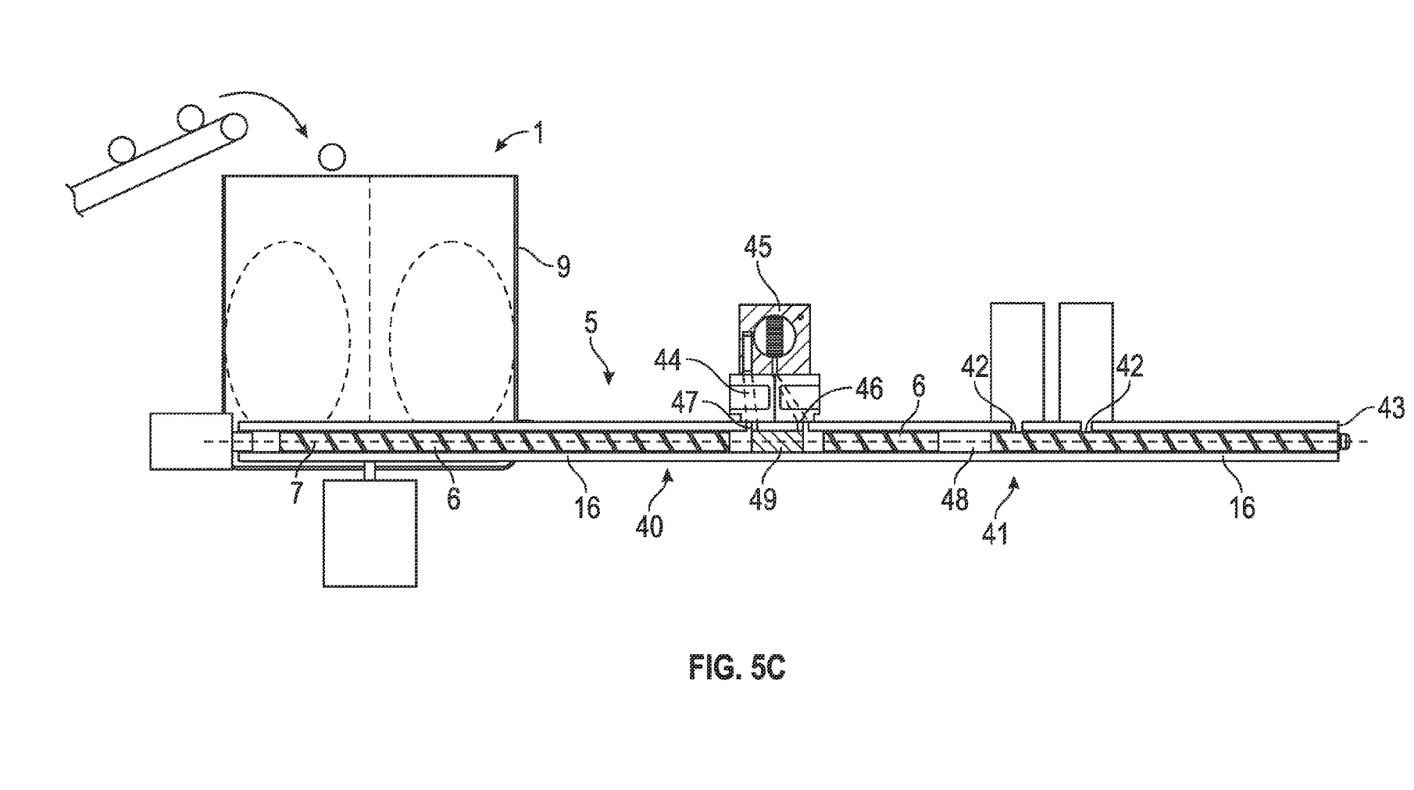

The housing 16, in which the screw 6 rotates, is divided into two spatially separate, adjacent chambers 40, 41, which are fluidically separated from one another by a blocking component 49, for example a back-conveying thread (FIG. 5). In the frontal chamber 40, which is situated further upstream, close to the container 1, there is the first screw section of the screw 6, and also the intake aperture 80 from which the material enters from the container 1 into the screw 6. In the rearward chamber 41, situated further downstream, there is the second screw section, and there is at least one degassing aperture 42 for the escape of gases, and also an exit aperture 43, situated at the end, from which the cleaned and degassed melt exits the extruder 5.

The two chambers 40, 41 are fluidically connected to one another through at least one channel 44. Disposed in this channel 44 is a melt filter 45 through which the melt necessarily passes. The degassing aperture 42, viewed in the direction of conveying of the extruder 5, is situated downstream, after the opening 46 of the channel 44 into the rearward chamber 41, and upstream, ahead of the exit aperture 43.

The material passing from the container 1 into the screw 6 is melted in the first screw section or in the frontal chamber 40, then passes through an opening 47 out into the channel 44, and is filtered through the melt filter 45. The filtered melt then passes through the opening 46 into the second screw section or second chamber 41.

After that, the melt enters a homogenizing unit 48. This is generally a rotating body, as for example a screw, whose design exhibits a certain sequence of shearing regions and mixing regions. The intimate mixing for homogenizing the polymer is brought about by means of complex flow conditions within the interior of the rotating body or in the screw, or in the corresponding screw sections. As well as axial flows in the conveying direction 17, there are also radial flows and axial flows counter to the conveying direction 17, referred to as leakage flows. In the shearing regions there is an increase in the temperature of the melt, and in the mixing regions the sheared parts are mixed with the less-sheared parts, producing a certain temperature compensation. In this way the contaminant particles are comminuted and distributed, and the melt becomes effectively homogenized and prepared for degassing.

Provided directly thereafter is a degassing unit, for removing any gas bubbles and gas inclusions from the homogenized melt. The gas is able to escape through the degassing apertures 42.

After having passed these degassing apertures 42, the plastics material arrives via a discharge unit, in the form for example of a discharge screw with low shearing performance, at the exit aperture 43, connected to which there may be (not shown) implements and/or subsequent operating units, e.g., pelletizing equipment.

The two screw sections of the chambers 40, 41 are usefully mounted in bores in the housing 16, these bores being arranged coaxially relative to one another and each having the same diameter. The coaxial arrangement of the two screw sections and of the homogenizer 48 makes it possible in a simple way to combine these two screw sections to form a single constructional body with a common core, and to drive the two screw sections jointly from one side, in other words from the lower side shown in FIG. 2 or left-hand side in FIG. 5. If a back-conveying thread 49 is used, then it is situated externally on the single screw 6, which extends continuously from the container 1 to the exit aperture 43.

In order to promote the degassing of the processed plastics material in the chamber 41, an unpressurized zone is provided in the region between the opening 46 and the degassing aperture 42, this zone being formed by a reduced core diameter of the screw 6. After the degassing aperture 42, this reduced core diameter undergoes transition back into the full core diameter of the discharge unit, in order to maintain the plastics material again under pressure and with sufficient plastification. This can be seen, for example, with the apparatus according to FIG. 5c.

In FIG. 2, the characterizing lengths and sections of the chambers 40, 41 or of the screws 6 have been drawn only by way of example. Like the other features shown in the figures, these components are only schematic, and are not true to scale or correct in their relationship, and in some cases have been abbreviated schematically by means of interruptions.

Figure 3:
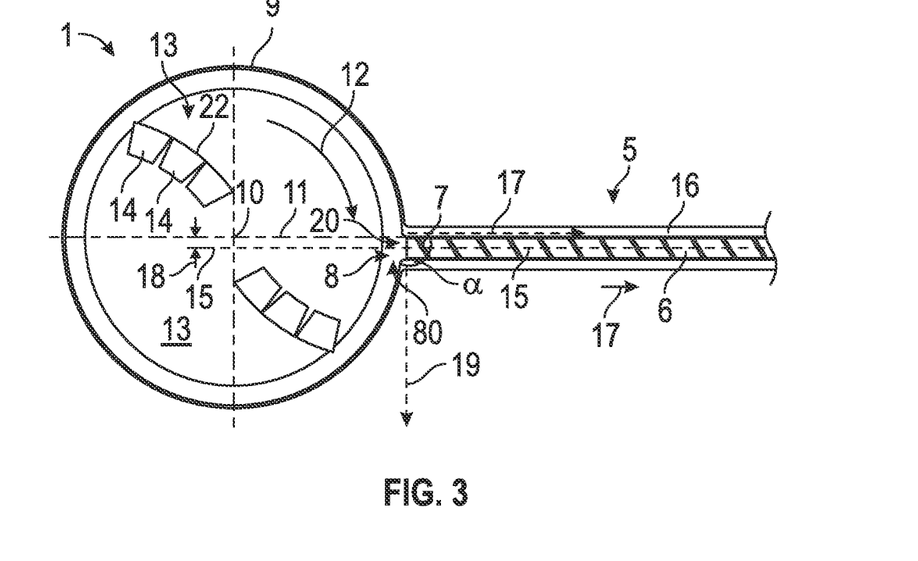
FIG. 3 shows another embodiment with minimal offset.
Figure 4:
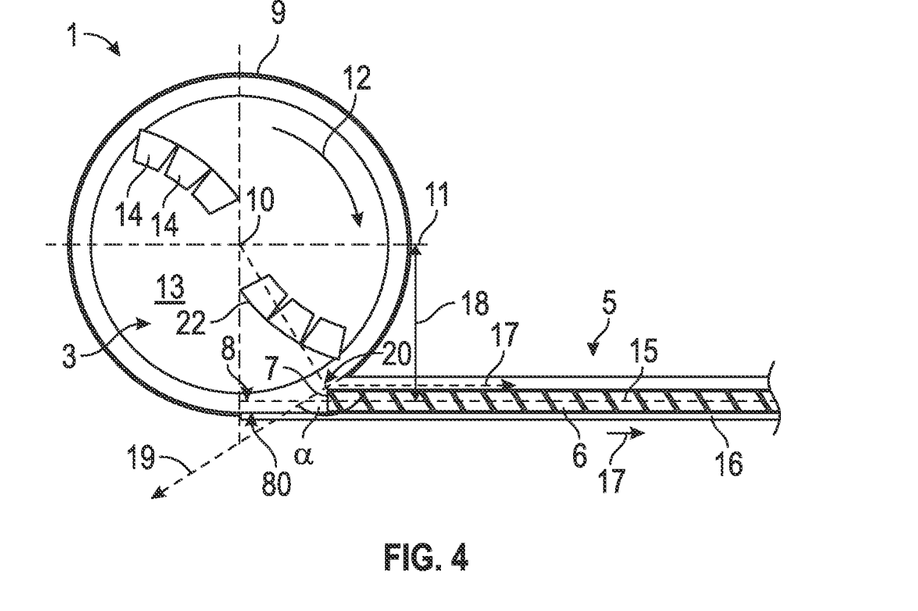
FIG. 4 shows another embodiment with relatively large offset.

FIGS. 3 and 4 show details of the transition region from the cutting compactor to the extruder 5, and serve primarily to illustrate the possibilities for connection of the extruder 5 in terms of the direction of rotation.

FIG. 3 shows an alternative embodiment in which the extruder 5 is attached to the container 1 not tangentially but instead by its end 7. The screw 6 and the housing 16 of the extruder 5 have been adapted in the region of the aperture 8 to the shape of the inner wall of the container 1, and have been offset backwards so as to be flush. No part of the extruder 5 protrudes through the aperture 8 into the space within the container 1.

The distance 18 here corresponds to about 5 to 10% of the radius 11 of the container 1 and to about half of the internal diameter d of the housing 16. This embodiment therefore represents the second limiting case or extreme value with the smallest possible offset or distance 18, where the direction 12 of rotation or of movement of the mixing and/or comminution implements 3 is at least slightly opposite to the direction 17 of conveying of the extruder 5, and specifically across the entire area of the aperture 8.

The scalar product in FIG. 3 at that threshold point 20 situated furthest upstream is precisely zero, where this is the point located at the edge that is associated with the aperture 8 and situated furthest upstream. The angle α between the direction vector 17 for the direction of conveying and the direction vector for the direction 19 of rotation, measured at point 20 in FIG. 3, is precisely 90°. If one proceeds further downwards along the aperture 8, i.e. in the direction 12 of rotation, the angle between the direction vectors becomes ever greater and becomes an oblique angle >90°, and at the same time the scalar product becomes negative. However, at no point, or in no region of the aperture 8 is the scalar product positive, or the angle smaller than 90°. No local overfeed can therefore occur even in a subregion of the aperture 8, and no detrimental excessive stuffing effect can occur in a region of the aperture 8.

This also represents a decisive difference in relation to a purely radial arrangement, since there would be an angle α<90° at point 20 or at the edge 20' in a fully radial arrangement of the extruder 5, and those regions of the aperture 8 situated, in the drawing, above the radial 11 or upstream thereof or on the inflow side thereof would have a positive scalar product. It would thus be possible for locally melted plastics product to accumulate in these regions.

FIG. 4 depicts another alternative embodiment in which the extruder 5 is somewhat further offset than in FIG. 3 on the outflow side, but still not tangentially as in FIGS. 1 and 2. In the present case, as also in FIG. 3, the rearward imaginary continuation of the longitudinal axis 15 of the extruder 5 passes through the space within the container 1 in the manner of a secant. As a consequence of this, the aperture 8 is—measured in the circumferential direction of the container 1—wider than in the embodiment according to FIG. 3. The distance 18 is also correspondingly greater than in FIG. 3, but somewhat smaller than the radius 11. The angle α measured at point 20 is about 150°, and the stuffing effect is therefore reduced in comparison with the apparatus of FIG. 3; this is more advantageous for certain sensitive polymers. The inner wall of the housing 16 or the right-hand-side inner edge, as seen from the container 1, is tangential to the container 1, and therefore, unlike in FIG. 3, there is no oblique transitional edge. At this point that is associated with the aperture 8 and situated furthest downstream, on the extreme left-hand side in FIG. 4, the angle is about 180°.

Depicted in FIGS. 5a, b and c there is an apparatus very similar to that of FIG. 2, this apparatus being shown from different perspectives—in a sectional view from the side (FIG. 5a), in a sectional view from above (FIG. 5b), and in a sectional view from the side, rotated by 90° (FIG. 5c). The comments made in relation to FIG. 2 apply analogously to these figures.

The invention claimed is:

1. An apparatus for the pretreatment and subsequent plastification of plastics, waste for recycling purposes, with a container (1) for the material to be processed, wherein at least one mixing and/or comminution implement (3) which is rotatable around an axis (10) of rotation and which is intended for the mixing, heating and optionally comminution of the plastics material is in the container (1), where an aperture (8) through which the pretreated plastics material can be removed from the interior of the container (1) is formed in a side wall (9) of the container (1) in the region of the level of the, or of a lowest, mixing and/or comminution implement (3) that is closest to a base of the container (1), where at least one extruder or compactor (5) is provided to receive the pretreated material, and has at least one screw (6) which rotates in a housing (16) and which has plastifying action, where the housing (16) has, located at its end (7) or in its jacket wall, an intake aperture (80) for the material to be received by the screw (6), and there is connection between the intake aperture (80) and the aperture (8), where the housing (16) is divided into two spatially separate chambers (40, 41), or there are two spatially separate chambers (40, 41), of which the frontal chamber (40), lying further upstream, has the intake aperture (80), and the rearward chamber (41), lying further downstream, has at least one degassing aperture (42) for the escape of gases, and also an exit aperture (43) for the cleaned and degassed melt, where the two chambers (40, 41) are connected with one another through at least one channel (44) in which there is at least one melt filter (45) through which the melt passes, and where each degassing aperture (42), viewed in the direction of conveying of the extruder (5), is sited downstream, after an inlet opening (46) of each channel (44) into the rearward chamber (41), and upstream, before the exit aperture (43), wherein the imaginary continuation of the central longitudinal axis (15) of the extruder (5) or of the screw (6) closest to the intake aperture (80), in a direction opposite to the direction (17) of conveying of the extruder (5), passes, and does not intersect, the axis (10) of rotation, there being, on the outflow side or in the direction (12) of rotation or of movement of the mixing and/or comminution implement (3), an offset distance (18) between the longitudinal axis (15) of the extruder (5) or of the screw (6) closest to the intake aperture (80), and a radius (11) of the container (1) that is parallel to the longitudinal axis (15) and that proceeds outwards from the axis (10) of rotation of the mixing and/or comminution implement (3) in the direction (17) of conveying of the extruder (5), and wherein the length (L) of the screw (6) in the frontal chamber (40), measured from the intake aperture (80) edge (20') situated downstream in the direction of conveying of the screw (6), to an outlet opening (47), formed in the housing (16), of the channel (44) which is situated furthest upstream and which leads to the melt filter (45), is in a range from 10 to 40 times, the nominal diameter (d) of the screw (6), and wherein the distance from the opening (46) of the channel (44) into the rearward chamber (41) to the degassing aperture (42) situated furthest upstream is in a range from 1.5 to 15 times, the nominal diameter (d) of the screw (6).

2. The apparatus according to claim 1, wherein downstream, after the opening (46) of the channel (44) into the rearward chamber (41) and before the degassing aperture (42) situated furthest upstream, there is a homogenizing unit (48) connected for homogenizing the filtered melt, or wherein this region the screw (6) has a flight geometry which brings about homogenization of the melt, the melt being subjected to intense shearing stress and stretching stress and being highly accelerated.

3. The apparatus according to claim 2, wherein the homogenizing unit (48), or wherein the screw (6), has a section which is situated upstream and with which the melt is subjected to shearing, and has a further section, situated downstream thereof, with which the melt is mixed.

4. The apparatus according to claim 2, wherein the container (1), the extruder (5), the chambers (40, 41), the melt filter or filters (45), the homogenizing unit (48) and the degassing aperture or apertures (42) are disposed axially in series or lie on a common longitudinal axis (15) or lie around a common longitudinal axis (15).

5. The apparatus according to claim 1, wherein the two chambers (40, 41) are separated by a back-conveying thread (49) provided on the periphery of the screw (6).

6. The apparatus according to claim 5, wherein the outlet opening (47) and the inlet opening (46) of the channel (44) open out and in, respectively, immediately before and after the back-conveying thread (49), respectively.

7. The apparatus according to claim 1, wherein between the inlet opening (46) of the channel (44) into the rearward chamber (41) and the degassing aperture (42) that is situated furthest upstream, the screw is designed with a decompressing action or has a flight geometry which produces an unpressurized zone extending up to degassing apertures (42).

8. The apparatus according to claim 1, wherein, for an extruder (5) in connection with the container (1), a scalar product of a direction vector that is associated with a direction (19) of rotation and that is tangential to the circle described by the radially outermost point of the mixing and/or comminution implement (3) or that is tangential to the plastics material transported past the aperture (8) and that is normal to a radius (11) of the container (1), and that points in a direction (12) of rotation or of movement of the mixing and/or comminution implement (3), and of a direction vector (17) that is associated with a direction of conveying of the extruder (5) at each individual point or in the entire region of the aperture (8) or immediately radially in front of the aperture (8) is zero or negative.

9. The apparatus according to claim 1, wherein an angle (α) included between a direction vector that is associated with a direction (19) of rotation of the radially outermost point of the mixing and/or comminution implement (3) and a direction vector (17) that is associated with the direction of conveying of the extruder (5) is greater than or equal to 90° and smaller than or equal to 180°, measured at the point of intersection of the two direction vectors (17, 19) at the inflow-side edge that is associated with the aperture (8) and that is situated upstream in relation to the direction (12) of rotation or of movement of the mixing and/or comminution implement (3) at the point (20) that is on the said edge or on the aperture (8) and is situated furthest upstream.

10. The apparatus according to claim 1, wherein an angle (β) included between a direction vector (19) that is associated with a direction (12) of rotation or of movement of the mixing and/or comminution implement (3) and a direction vector (17) that is associated with a direction of conveying of the extruder (5) is from 170° to 180°, measured at the point of intersection of the two direction vectors (17, 19) in the middle of the aperture (8).

11. The apparatus according to claim 1, wherein the offset distance (18) is greater than or equal to half of an internal diameter of the housing (16) of the extruder (5) or of the screw (6), and/or greater than or equal to 7% of the radius of the container (1), or wherein the offset distance (18) is greater than or equal to the radius of the container (1).

12. The apparatus according to claim 1, wherein the imaginary continuation of the longitudinal axis (15) of the extruder (5) in a direction opposite to the direction of conveying is arranged in the manner of a secant in relation to the cross section of the container (1), and, at least in sections, passes through the space within the container (1).

13. The apparatus according to claim 1, wherein the extruder (5) is attached tangentially to the container (1) or runs tangentially in relation to the cross section of the container (1), or wherein the longitudinal axis (15) of the extruder (5) or of the screw (6) or the longitudinal axis of the screw (6) closest to the intake aperture (80) runs tangentially with respect to the inner side of the side wall (9) of the container (1), or the inner wall of the housing (16) does so, or an enveloping end of the screw (6) does so, where there is a drive connected to the end (7) of the screw (6), and that the screw provides conveying, at its opposite end, to a discharge aperture.

14. The apparatus according to claim 13, wherein the discharge aperture includes an extruder head arranged at the end of the housing (16).

15. The apparatus according to claim 1, wherein there is immediate and direct connection between the aperture (8) and the intake aperture (80), without substantial separation.

16. The apparatus according to claim 1, wherein the mixing and/or comminution implement (3) comprises implements and/or blades (14) which, in a direction (12) of rotation or of movement, have a comminuting, cutting and heating effect on the plastics material, where the implements and/or blades (14) are arranged or formed on or at a rotatable implement carrier (13) which is a carrier disc (13) and which is arranged parallel to a basal surface (2) of the container (1).

17. The apparatus according to claim 1, wherein a manner of formation, set-up, curvature and/or arrangement of the frontal regions or frontal edges (22) that are associated with the mixing and/or comminution implements (3) or with the blades (14), act on the plastics material and point in a direction (12) of rotation or of movement, differs when comparison is made with the regions that, in the direction (12) of rotation or of movement, are at the rear or behind.

18. The apparatus according to claim 1, wherein the container (1) is in essence cylindrical with circular cross section and with a level basal surface (2) and with, orientated vertically in relation thereto, a side wall (9) which has the shape of the jacket of a cylinder, and/or the axis (10) of rotation of the mixing and/or comminution implements (3) coincides with the central axis of the container (1), and/or the axis (10) of rotation or the central axis are orientated vertically and/or normally in relation to the basal surface (2).

19. The apparatus according to claim 1, wherein a lowest implement carrier (13) or a lowest of the mixing and/or comminution implements (3) and/or the aperture (8) are arranged close to the base at a small distance from a basal surface (2) of the container (1), in the region of the lowest quarter of the height of the container (1), at a distance of from 10 mm to 400 mm from the basal surface (2) of the container (1).

20. The apparatus according to claim 1, wherein the extruder (5) is a single-screw extruder (6) with a single compression screw (6).

21. The apparatus according to claim 1, wherein there is immediate and direct connection between the aperture (8) and the intake aperture (80), without a transfer section or a conveying screw.

22. The apparatus according to claim 1, wherein the length (L) of the screw (6) in the frontal chamber (40), measured from the intake aperture (80) edge (20') situated downstream in the direction of conveying of the screw (6), to the outlet opening (47), formed in the housing (16), of the channel (44) which is situated furthest upstream and which leads to the melt filter (45) is 15 to 30 times the nominal diameter (d) of the screw (6).

23. The apparatus according to claim 1, wherein the offset distance (18) is greater than or equal to 20% of the radius of the container (1), or wherein the offset distance (18) is greater than or equal to the radius of the container (1).

24. The apparatus according to claim 1, wherein the distance from the opening (46) of the channel (44) into the rearward chamber (41) to the degassing aperture (42) situated furthest upstream is 3 to 12 times the nominal diameter (d) of the screw (6).

\* \* \* \* \*